(12) United States Patent
Bernardele

(10) Patent No.: US 10,704,595 B2
(45) Date of Patent: Jul. 7, 2020

(54) BEARING CUP FOR A BICYCLE BOTTOM BRACKET ASSEMBLY AND BICYCLE BOTTOM BRACKET ASSEMBLY COMPRISING SAID BEARING CUP

(71) Applicant: CAMPAGNOLO S.r.l., Vicenza (IT)

(72) Inventor: Davide Bernardele, Caldogno (IT)

(73) Assignee: CAMPAGNOLO S.R.L., Vicenza (IT)

( * ) Notice: Subject to any disclaimer, the term of this patent is extended or adjusted under 35 U.S.C. 154(b) by 0 days.

(21) Appl. No.: 16/134,384

(22) Filed: Sep. 18, 2018

(65) Prior Publication Data

US 2019/0085899 A1    Mar. 21, 2019

(30) Foreign Application Priority Data

Sep. 19, 2017   (IT) .................. 102017000104706

(51) Int. Cl.
| | | |
|---|---|---|
| *F16C 35/077* | (2006.01) | |
| *F16C 19/54* | (2006.01) | |
| *B62M 3/00* | (2006.01) | |
| *B62K 19/34* | (2006.01) | |
| *F16C 35/067* | (2006.01) | |

(52) U.S. Cl.
CPC .............. *F16C 19/54* (2013.01); *B62K 19/34* (2013.01); *B62M 3/003* (2013.01); *F16C 35/067* (2013.01); *F16C 35/077* (2013.01); *F16C 2226/12* (2013.01); *F16C 2326/26* (2013.01); *F16C 2326/28* (2013.01)

(58) Field of Classification Search
CPC ...... F16C 19/54; F16C 35/067; F16C 35/077; F16C 2326/26; F16C 2326/28; B62K 19/34; B62M 3/003
See application file for complete search history.

(56) References Cited

U.S. PATENT DOCUMENTS

| | | | |
|---|---|---|---|
| 3,532,402 A | 10/1970 | Beery et al. | |
| 4,611,933 A | 9/1986 | Hofmann et al. | |
| 6,755,095 B2 * | 6/2004 | Yamanaka | ............ B25B 15/005 74/594.1 |

(Continued)

FOREIGN PATENT DOCUMENTS

| | | |
|---|---|---|
| DE | 102007027772 A1 | 12/2008 |
| JP | H09 303409 A | 11/1997 |
| JP | 2009 250357 A | 10/2009 |

OTHER PUBLICATIONS

Italian Search Report and Written Opinion in Italian Application No. 102017000104706, dated May 9, 2018, with English translation.

*Primary Examiner* — Phillip A Johnson
(74) *Attorney, Agent, or Firm* — Volpe and Koenig, P.C.

(57) ABSTRACT

A bearing cup for a bicycle bottom bracket assembly is disclosed. The bearing cup comprises an annular body having a radially outer substantially cylindrical surface portion configured to be coupled with the frame of the bicycle and a radially inner substantially cylindrical surface portion defining a housing seat for a bearing. A plurality of ribs extend radially inwards from said radially inner substantially cylindrical surface portion. The plurality of ribs are configured to be coupled with interference with said bearing. In another embodiment, a bicycle bottom bracket assembly is disclosed that includes the aforementioned bearing cup and a bearing configured to be housed inside the bearing cup.

19 Claims, 9 Drawing Sheets

(56) References Cited

U.S. PATENT DOCUMENTS

| | | | |
|---|---|---|---|
| 9,388,847 B1 | 7/2016 | Wolfenbarger et al. | |
| 9,517,811 B1 * | 12/2016 | Shiraishi | B62M 3/003 |
| 2007/0095164 A1 | 5/2007 | Yamanaka et al. | |
| 2011/0232337 A1 | 9/2011 | Mola et al. | |

* cited by examiner

BEARING CUP FOR A BICYCLE BOTTOM BRACKET ASSEMBLY AND BICYCLE BOTTOM BRACKET ASSEMBLY COMPRISING SAID BEARING CUP

CROSS REFERENCE TO RELATED APPLICATION

This application claims the benefit of Italian Patent Application No. 102017000104706, filed on Sep. 19, 2017, which is incorporated herein by reference as if fully set forth.

FIELD OF INVENTION

The present invention relates to a bearing cup for a bottom bracket assembly of bicycle, in particular of a racing bicycle.

The present invention also relates to a bicycle bottom bracket assembly comprising at least one bearing cup of the type indicated above and a bearing configured to be housed inside said bearing cup.

BACKGROUND

As known, a bicycle bottom bracket assembly comprises a shaft, two crank arms associated with the opposite ends of the shaft and a pair of rolling bearings (hereinafter also simply indicated as "bearings"), each configured to be mounted on a respective end portion of a shaft-housing box suitably provided in the bicycle frame. Each bearing is intended to be coupled with a respective shaft portion adjacent to a respective crank arm so as to allow the rotation of the shaft inside the aforementioned shaft-housing box.

The shaft can be made in a single piece or in two distinct pieces coupled together, hereinafter indicated as "shaft elements". A shaft element can be distinct or made in a single piece with one of the two cranks. The assembly of a shaft element and of the respective crank arm is indicated hereinafter as "crank arm assembly".

The present invention has a preferred application in the case in which the shaft is defined by two shaft elements coupled together.

In many bottom bracket assemblies, the bearings are supported inside or outside the shaft-housing box by respective bearing cups mounted at the opposite end portions of the shaft-housing box. The mounting of the bearings outside the shaft-housing box allows the bearings to be brought closer to the crank arms, thus reducing the bending moment generated at the ends of the shaft. The mounting of the bearings inside the shaft-housing box, on the other hand, allows a shorter shaft and therefore one that is less deformable under torsion to be made.

The bearing cups are typically made of metal or plastic material and can be configured either to be screwed to the end portions of the shaft-housing box provided in the frame of the bicycle or to be coupled with interference with the end portions of the aforementioned shaft-housing box.

U.S. Pat. No. 9,388,847 describes a bottom bracket assembly wherein a provision is used suitable for avoiding having too high interferences. Such a document shows, in FIG. 10, a bush mounted with interference on the shaft-housing box provided on the frame of the bicycle. On the radially inner surface of the bush a bearing-housing seat is provided having a first annular portion designed to be coupled with interference with the bearing. In axially inner position and adjacent to the aforementioned first annular portion a second annular portion is provided having a greater diameter than that of the first annular portion and greater than the radially outer diameter of the bearing. Such a second annular portion is intended to allow possible overpressures to which the bearing is subjected following a too high interference between bush and shaft-housing box to be discharged.

The Applicant has felt the need to identify an alternative solution to that of U.S. Pat. No. 9,388,847 to avoid subjecting the bearing to overpressures due to a too high interference between bearing cup and shaft-housing box, such a solution also being suitable for avoiding running the risk of having a too low interference.

SUMMARY

The present invention therefore relates, in a first aspect thereof, to a bearing cup for a bicycle bottom bracket assembly. The bearing cup comprises an annular body having a radially outer substantially cylindrical surface portion configured to be coupled with the frame of the bicycle and a radially inner substantially cylindrical surface portion defining a housing seat for a bearing. A plurality of ribs extend radially inwards from said radially inner substantially cylindrical surface portion and are configured to be coupled with interference with said bearing.

BRIEF DESCRIPTION OF THE DRAWINGS

Further features and advantages of the present invention will become clearer from the following description of a preferred embodiment thereof, made hereinafter, for indicating and not limiting purposes, with reference to the attached drawings. In such drawings.

DETAILED DESCRIPTION OF THE PREFERRED EMBODIMENTS

Figure 1:
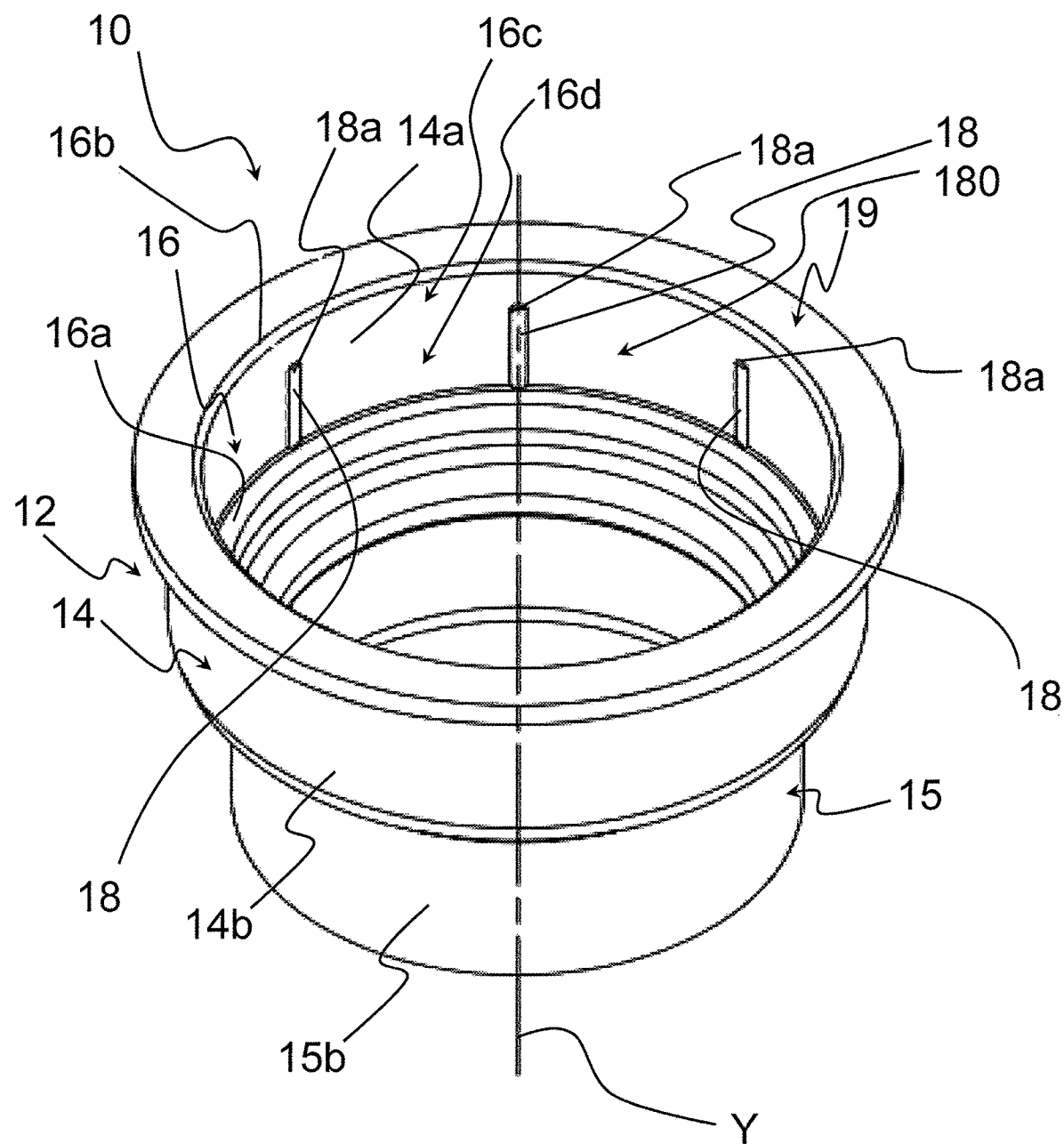
FIG. 1 is a schematic perspective view of a bearing cup for a bicycle bottom bracket assembly, in accordance with a first embodiment of the present invention.

The bearing cups of the present invention are configured to be coupled with interference with the end portions of the shaft-housing box provided in the frame of the bicycle.

Two different ways of mounting a bottom bracket assembly comprising bearing cups coupled with interference with the end portions of the shaft-housing box can be provided.

In accordance with a first way of mounting, each bearing is pre-mounted with interference inside a respective bearing cup and a shaft element is inserted with interference inside the inner ring of the bearing.

In accordance with a second way of mounting, each bearing is pre-mounted with interference on a respective shaft element and is coupled with interference with a respective bearing cup following the insertion of the shaft element inside the bearing cup.

The Applicant has observed that in both ways of mounting discussed above there are critical aspects related to the dimensional tolerances of the bearing cups and of the shaft-housing boxes.

If the interference between bearing cup and shaft-housing box is too small or insufficient, the bearing cup can be moved or rotated with respect to the frame causing problems of various kinds, like for example: noisiness, wearing of the shaft-housing box and/or of the bearing cup (if made of metal material), sensation of low rigidity of the crankset. Indeed, in the second way of mounting, there could be a very high clearance between bearing cup and bearing and, consequently, an unstable housing of the shaft inside the shaft-housing box provided in the frame of the bicycle.

If the interference between bearing cup and shaft-housing box is too high, the bearing cup can compress the outer ring of the bearing, which in turn presses on the balls of the bearing, thus significantly increasing the rolling friction and, consequently, reducing the smoothness of the rotation of the shaft or shaft element at the bearing. Furthermore, in the second way of mounting, the bearing may not easily enter inside the bearing cup determining a difficult mounting.

The Applicant has observed that the critical aspects discussed above occur frequently both due to the fact that the bearing cups are generally made of plastic (to allow a desired reduction of weight), i.e. a material having a large dimensional variability, and due to the fact that the frame (and therefore the shaft-housing box) is generally made through processes that cannot ensure very tight dimensional tolerances.

The Applicant deems that in order to obtain a coupling with interference that is simultaneously stable and easily obtainable it is suitable to provide interferences of a few hundredths of a millimeter (for example equal to 0.01-0.03 mm).

According to the Applicant, in order to be able to obtain such tight interferences with the current materials and manufacturing processes, without running the risk of having too small or too high interferences, it is necessary to provide suitable technical provisions.

In the present description and in the following claims, the terms "radially inner" and "radially outer" (and similar terms) refer to positions identified along directions perpendicular to a longitudinal axis of symmetry of the bearing cup (corresponding to the rotation axis of the shaft inside the shaft-housing box) and, respectively, closer to said longitudinal axis and further away from said longitudinal axis.

The terms "axially inner" and "axially outer" (and similar terms) refer to positions identified along a direction coinciding with or parallel to the aforementioned longitudinal axis and, respectively, closer to a middle transversal plane of the shaft-housing box and further away from said middle transversal plane (considering the bearing cup mounted in the shaft-housing box).

The term "rib" is meant to indicate an element having a prevalent dimension along a first direction and overhanging or protruding from a surface along a second direction different from said first direction, preferably substantially perpendicular to said first direction.

Advantageously, the plurality of ribs extending radially inwards defines in the bearing cup a substantially cylindrical virtual surface having a virtual diameter smaller than the radially inner nominal diameter of the radially inner substantially cylindrical surface portion of the housing seat of the bearing.

The bearing cup thus has, at the housing seat of the bearing, two different operative diameters: the radially inner nominal diameter of the radially inner substantially cylindrical surface portion, which is preferably greater than the radially outer nominal diameter of the bearing, and the virtual diameter defined by the ribs, which is less than the radially outer nominal diameter of the bearing. It is thus possible to couple with interference the outer ring of the bearing with only the ribs preventing there from being interference between the bearing and the radially inner substantially cylindrical surface portion of the housing seat of the bearing. This constitutes a difference with respect to what occurs in U.S. Pat. No. 9,388,847, wherein the interference with the bearing takes place along the entire substantially cylindrical surface of the first annular portion of the bearing-housing seat of the bush.

The provision of an interference only at the ribs avoids the risk of having a too high interference between bearing cup and bearing.

Moreover, the ease of deformation (preferably plastic) of the ribs makes it possible to provide a high interference at each rib, so as not to run the risk of having too low interference between bearing cup and bearing.

The bearing cup according to the present invention can comprise, singularly or in combination, one or more of the following preferred features.

Preferably, the ribs are circumferentially distributed in uniform manner along said radially inner substantially cylindrical surface portion.

Preferably, at least two of the aforementioned ribs have a same predetermined radial extension. More preferably, all of the ribs have a same predetermined radial extension.

Preferably, at least two of the aforementioned ribs have a same predetermined axial extension. More preferably, all of the ribs have a same predetermined axial extension.

Preferably, at least two of the aforementioned ribs have a same predetermined circumferential extension. More preferably, all of the ribs have a same predetermined circumferential extension.

Each of the aforementioned provisions allows the bearing mounted in the bearing cup to be perfectly centered, with rotation axis substantially coinciding with a longitudinal axis of symmetry of the bearing cup, and allows the outer ring of the bearing to be stressed in uniform manner along the entire cylindrical development thereof.

In a first preferred embodiment of the bearing cup of the invention, the ribs have a circumferential extension shorter than their axial extension and extend axially along respective directions substantially parallel to a longitudinal axis of symmetry of the annular body.

In this way, the axial insertion of the bearing in the housing seat provided in the bearing cup, as well as its extraction for a possible maintenance operation, are facilitated. Furthermore, there is a uniformity and homogeneity of pressure on the bearing during the insertion thereof, moreover facilitating the sliding of the bearing in the housing seat provided in the bearing cup.

In an alternative embodiment of the bearing cup of the invention, the ribs have a circumferential extension greater than their axial extension and extend circumferentially along at least one circumferential row.

Also in this case, there is a uniformity and homogeneity of pressure on the bearing during the insertion thereof inside the bearing cup and the centering of the bearing at completed insertion.

Preferably, the ribs are distributed in at least two circumferential rows parallel and coaxial to a longitudinal axis of symmetry of the annular body. In this way, a stable housing of the bearing inside the bearing cup is obtained.

Preferably, each rib of one of said circumferential rows is axially aligned with a respective rib of the other circumferential row along a respective direction substantially parallel to said longitudinal axis of symmetry.

In a further alternative embodiment of the bearing cup of the invention, the ribs extend continuously along said radially inner substantially cylindrical surface portion to define two annular ribs.

Also in this case there is a uniformity and homogeneity of pressure on the bearing during the insertion thereof inside the bearing cup and the centering of the bearing at completed insertion.

Preferably, the radially inner substantially cylindrical surface portion has a predetermined axial extension and the axial extension of the ribs is less than said predetermined axial extension.

More preferably, the housing seat of the bearing comprises an axially outermost first annular portion devoid of said ribs and an axially innermost second annular portion comprising said ribs.

Advantageously, the provision of the aforementioned first annular portion makes it possible to obtain a centering of the bearing before the insertion thereof with interference in the second annular portion.

Preferably, each of said ribs comprises a tapered axially outer end face.

Such tapering allows a gradual engagement of the ribs during the insertion of the bearing.

In a second aspect thereof, the invention relates to a bicycle bottom bracket assembly, comprising at least one bearing cup according to the first aspect of the invention and a bearing configured to be housed inside the bearing cup, wherein the bearing has a predetermined radially outer nominal diameter and the radially inner substantially cylindrical surface portion has a radially inner nominal diameter greater than said predetermined radially outer nominal diameter.

Advantageously, such an assembly allows all of the advantages described above with reference to the first aspect of the invention to be obtained.

With reference to FIGS. 1-8, reference numeral 10 indicates a bearing cup in accordance with the invention.

FIGS. 1-6 illustrate three different embodiments of the bearing cup 10.

Figure 7:
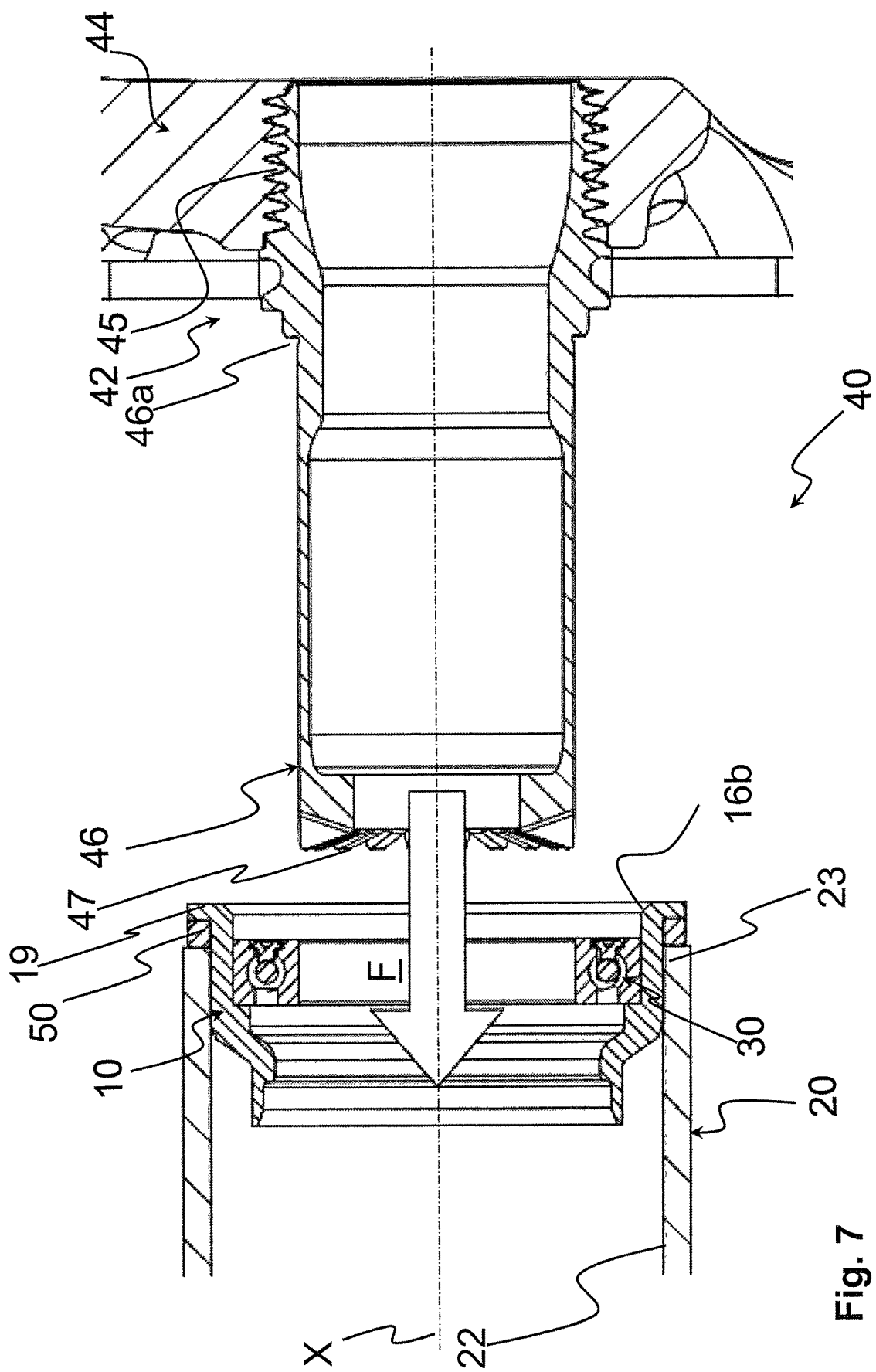
FIG. 7 is a schematic longitudinal section view of a portion of a bicycle bottom bracket assembly in accordance with the present invention: in particular a first way of mounting such an assembly is illustrated.
Figure 8:
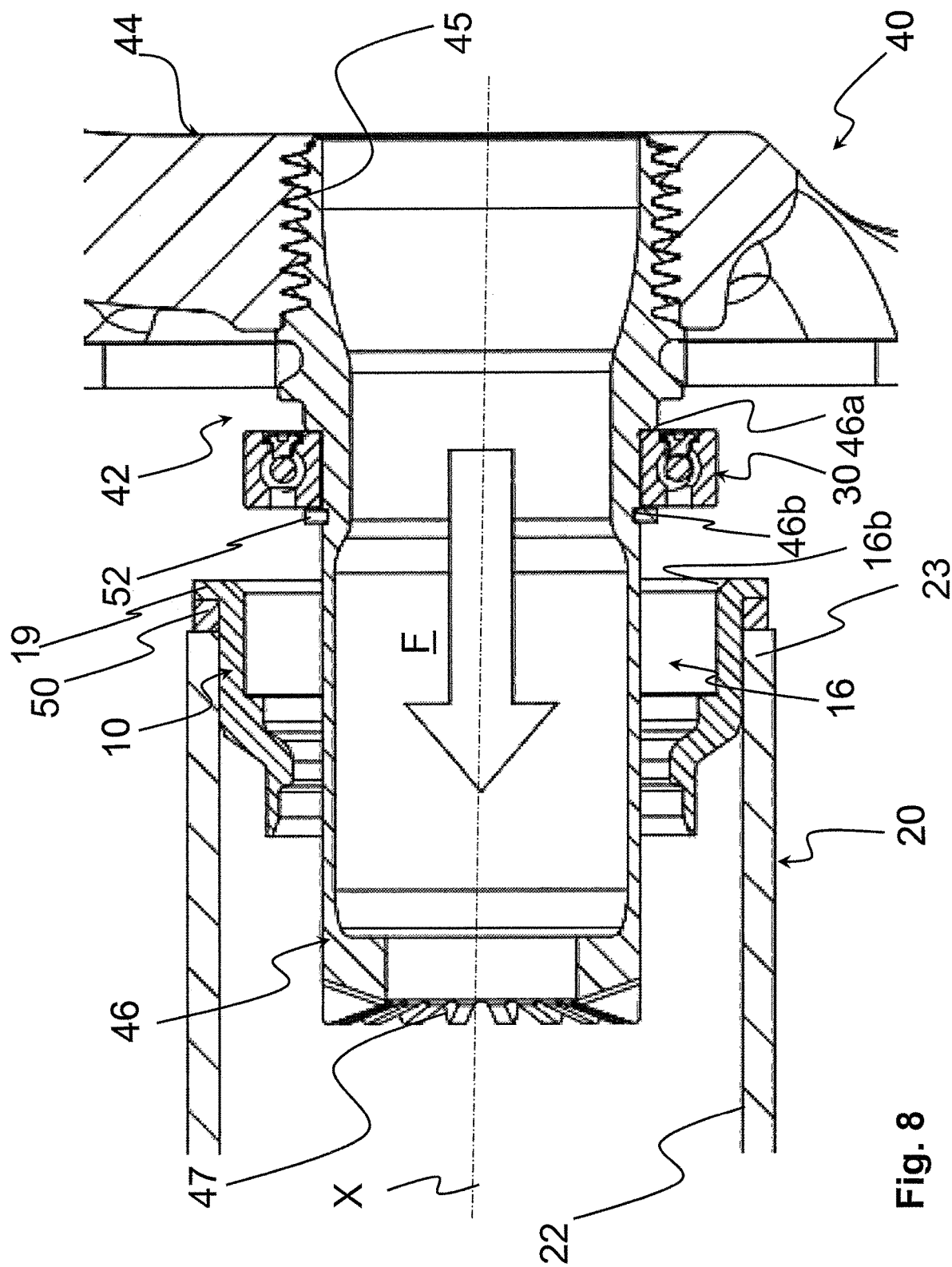
FIG. 8 is a schematic longitudinal section view of a portion of a bicycle bottom bracket assembly in accordance with the present invention: in particular a second way of mounting such an assembly is illustrated.

The bearing cup 10 is used in a bottom bracket assembly 40, like for example the one shown in part in FIGS. 7 and 8.

The bottom bracket assembly 40 of FIGS. 7 and 8 essentially comprises two crank arm assemblies 42 (FIGS. 7 and 8 show a single crank arm assembly 42) coupled together, each comprising a crank arm 44 and a hollow shaft element 46.

The shaft element 46 of the bottom bracket assembly 40 extends along a longitudinal axis X and is partially housed in a suitable shaft-housing box 22 formed in the bicycle frame 20 and extending along the longitudinal axis X. The shaft-housing box 22 typically has a tubular shape.

The shaft element 46 is supported in rotation in the shaft-housing box 22 around the longitudinal axis X through a bearing 30.

The bearing 30 is operatively interposed between the shaft element 46 and the bearing cup 10 and the latter is operatively interposed between the bearing 30 and the shaft-housing box 22 at a free end portion 23 of the shaft-housing box 22.

Figure 9:
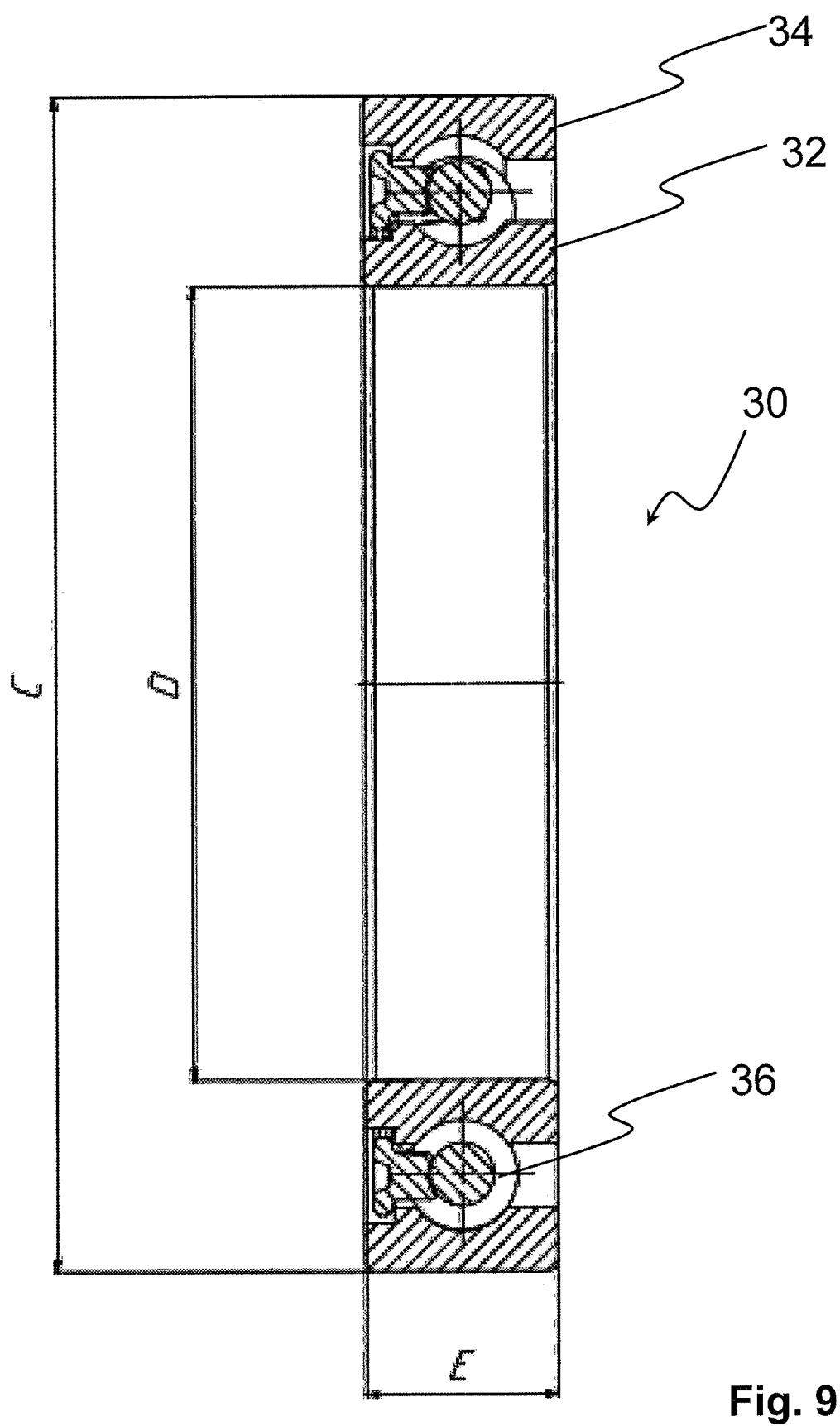
FIG. 9 is a schematic longitudinal section view of a bearing used in the bicycle bottom bracket assembly of FIGS. 7 and 8.

As shown in FIG. 9, the bearing 30 has an inner ring 32 and an outer ring 34, which rotate with respect to one another thanks to a plurality of balls 36 or rollers interposed between the inner ring 32 and the outer ring 34. The bearing 30 has a radially inner nominal diameter (corresponding to the radially inner diameter of the inner ring 32) that in FIG. 9 is indicated with D and a radially outer nominal diameter (corresponding to the radially outer diameter of the outer ring 34) that in FIG. 9 is indicated with C. The bearing 30 has an axial dimension that in FIG. 9 is indicated with E.

The inner ring 32 is coupled with interference with the shaft element 46, whereas the outer ring 34 is coupled with interference with the bearing cup 10.

The bearing cup 10 is coupled with interference with the free end portion 23 of the shaft-housing box 22, as illustrated in FIGS. 7 and 8.

In all of the embodiments illustrated in FIGS. 1-6, the bearing cup 10 comprises an annular body 12 having a longitudinal axis of symmetry Y that, when the bearing cup is mounted in the shaft-housing box 22 (FIGS. 7 and 8) and when the bottom bracket assembly 40 is assembled, substantially coincides with the longitudinal axis X of the shaft element 46.

The bearing cup 10 can be made both from metal material, like for example aluminum alloys, and from plastic material, like for example a composite material.

The aforementioned composite material can comprise structural fibers incorporated in a polymeric material. Preferably, the structural fibers are selected from the group consisting of: carbon fibers, glass fibers, aramid fibers, ceramic fibers, boron fibers and combinations thereof, carbon fibers being preferred. Preferably, the polymeric material is a thermosetting material, but this does not rule out the possibility of using a thermoplastic material. More preferably the polymeric material comprises an epoxy resin.

The arrangement of the structural fibers in the polymeric material can be a random arrangement of pieces or small sheets of structural fibers, a substantially unidirectional ordered arrangement of fibers, a substantially bidirectional ordered arrangement of fibers, or a combination thereof.

In its preferred embodiments, like for example those of FIGS. 1-6, the annular body 12 comprises a substantially cylindrical main portion 14 provided with a radially inner substantially cylindrical surface portion 14a and with a radially outer substantially cylindrical surface portion 14b.

The radially outer substantially cylindrical surface portion 14b has a radially outer nominal diameter selected so as to allow a coupling, preferably with interference, of the bearing cup 10 with the shaft-housing box 22.

The radially inner substantially cylindrical surface portion 14a defines in the annular body 12 a housing seat 16 of the bearing 30, in particular of the outer ring 34 of the bearing 30, and has a radially inner nominal diameter preferably greater than the radially outer nominal diameter C of the bearing 30.

Figure 2:
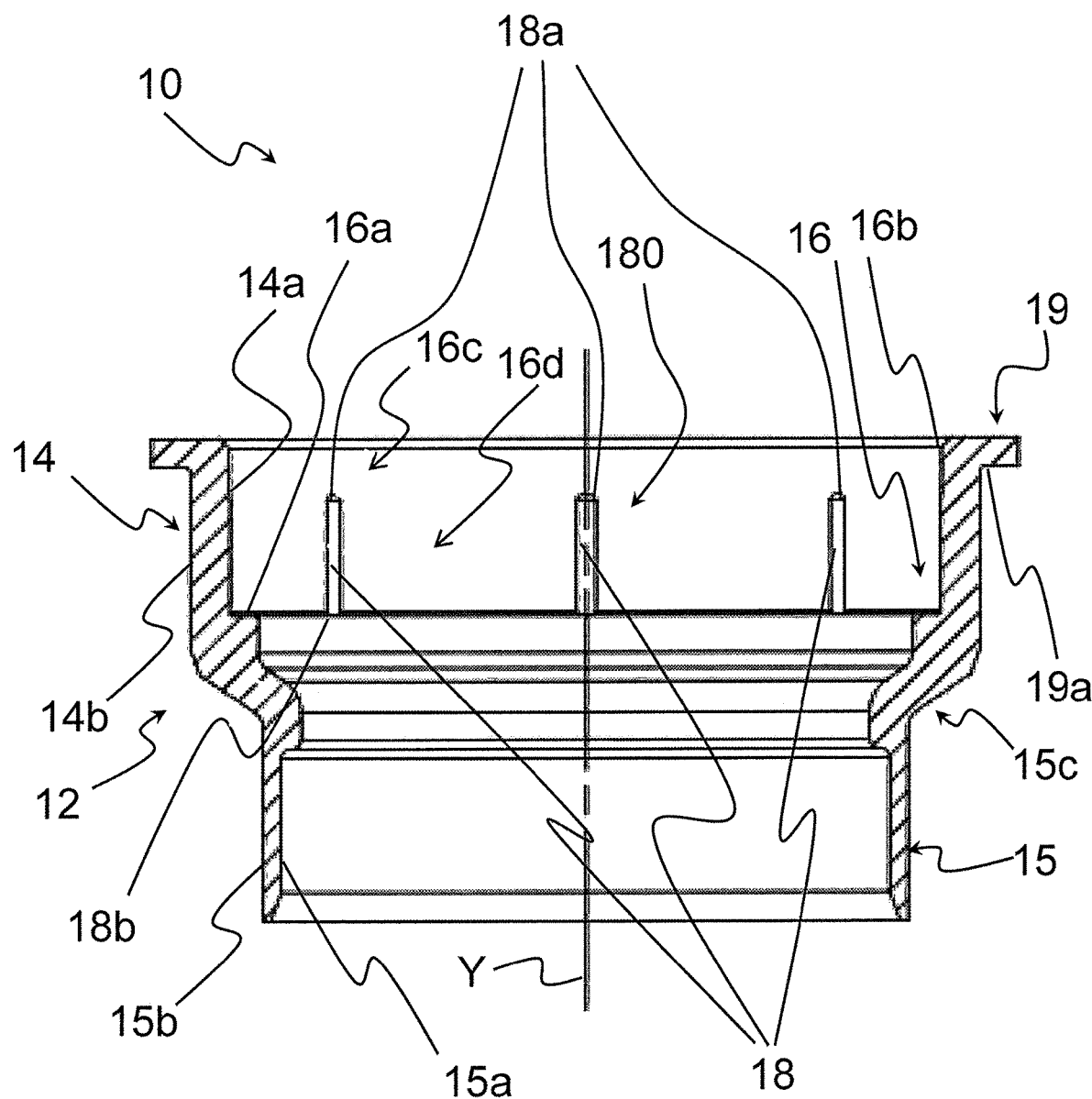
FIG. 2 is a schematic longitudinal section view of the bearing cup of FIG. 1.
Figure 4:
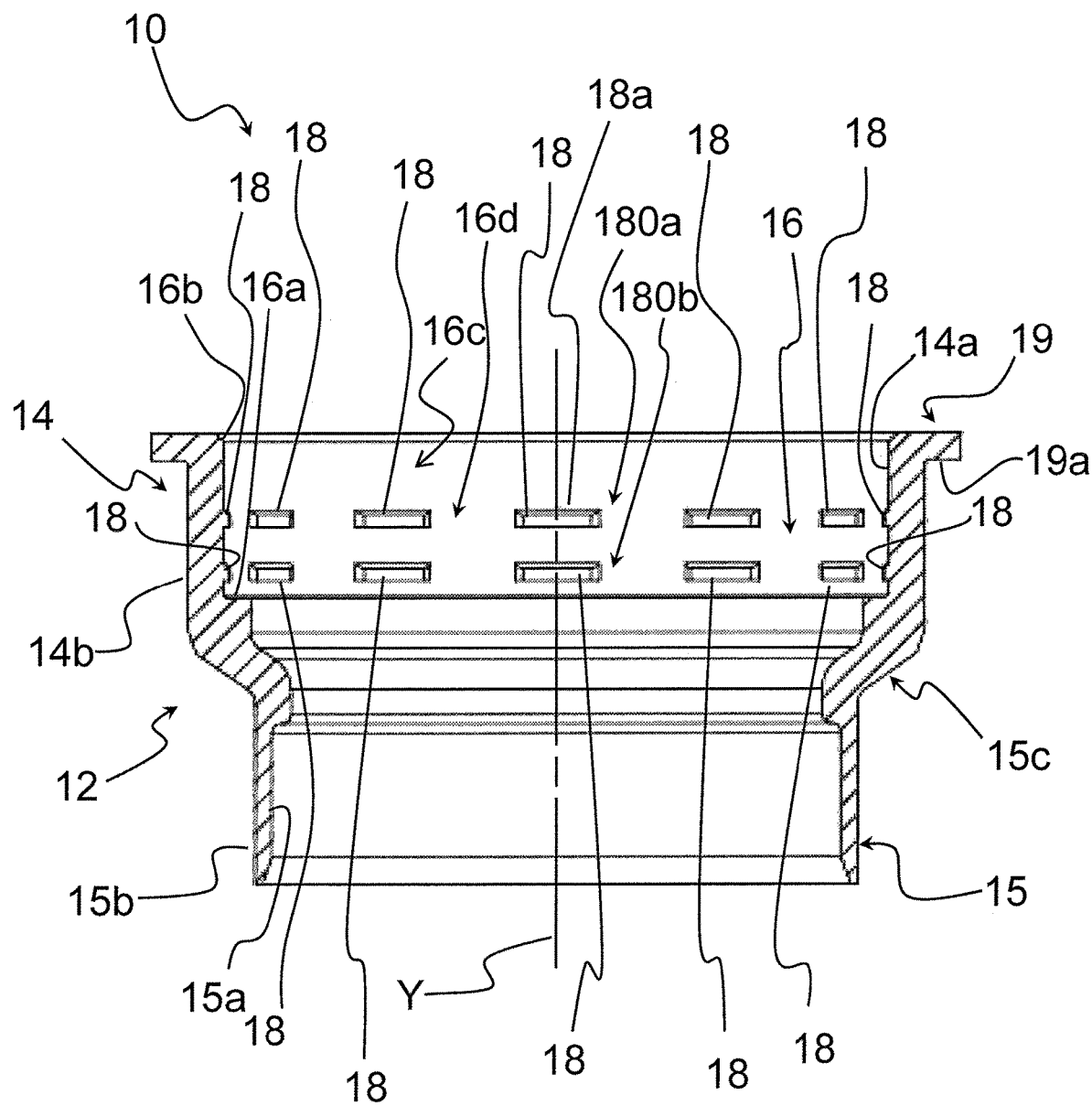
FIG. 4 is a schematic longitudinal section view of the bearing cup of FIG. 3.
Figure 6:
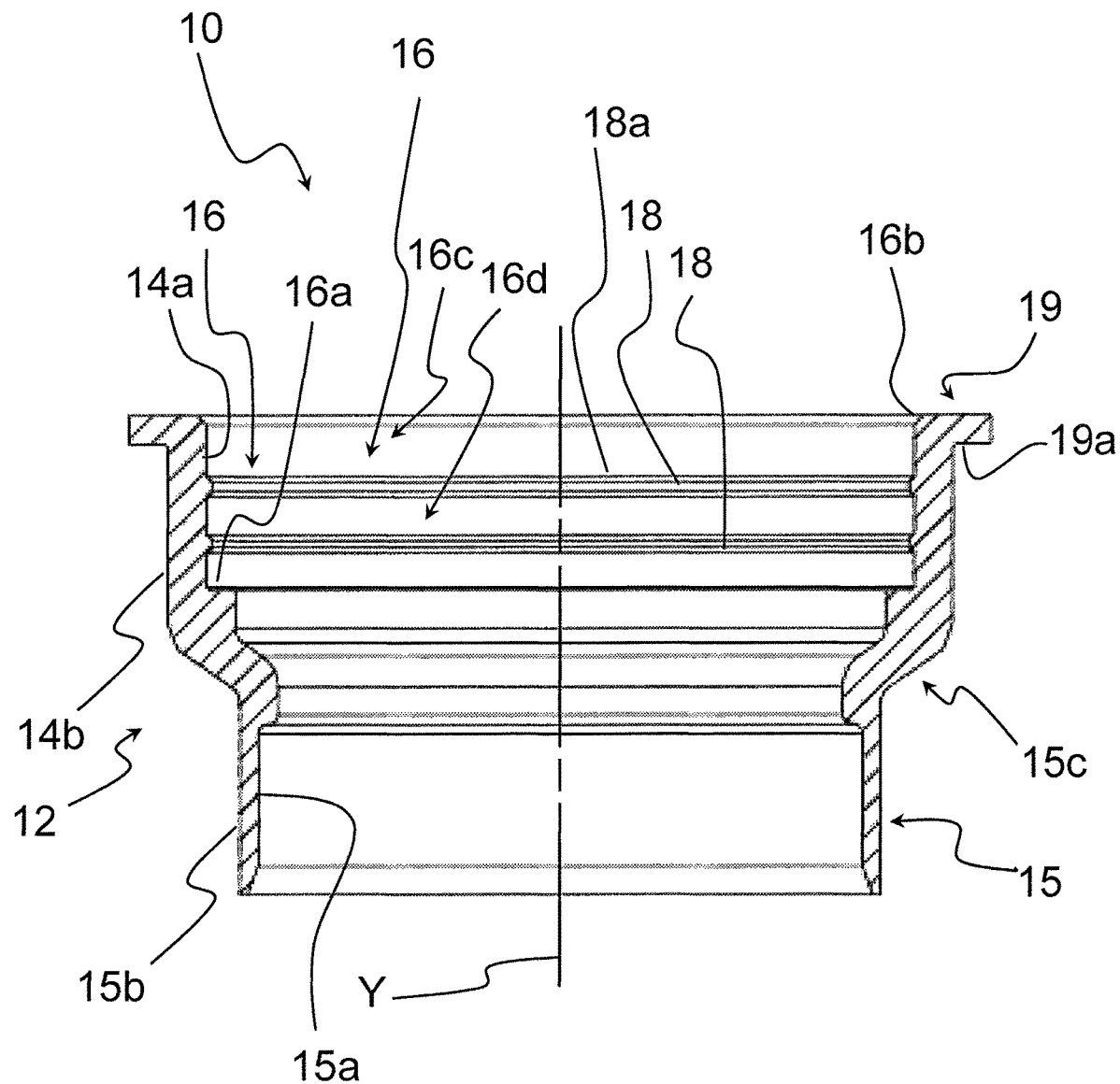
FIG. 6 is a schematic longitudinal section view of the bearing cup of FIG. 5.

The axially inner part of the aforementioned housing seat 16 comprises an abutment shoulder 16a of the bearing 30, in particular of the outer ring 34 of the bearing 30 (FIGS. 2, 4 and 6).

With reference to FIGS. 1-6, the annular body 12 comprises a substantially cylindrical secondary portion 15 arranged in axially inner position with respect to the substantially cylindrical main portion 14. The substantially cylindrical secondary portion 15 is provided with a radially inner substantially cylindrical surface portion 15a and with a radially outer substantially cylindrical surface portion 15b (FIGS. 2, 4 and 6). The diameter of the radially outer substantially cylindrical surface portion 15b is less than the diameter of the radially inner substantially cylindrical surface portion 14a and greater than the radially outer diameter of the shaft element 46.

The annular body 12 comprises a connection portion 15c axially interposed between the substantially cylindrical main portion 14 and the substantially cylindrical secondary portion 15.

In all of the embodiments discussed above, the annular body 12 comprises at least two ribs 18 projecting radially inwards from the radially inner substantially cylindrical surface portion 14a. In particular, the ribs 18 extend radially inwards from the radially inner substantially cylindrical surface portion 14a and, as discussed below, are configured to be coupled with interference with the outer ring 34 of the bearing 30.

The radially inner end portions of the ribs 18 define a substantially cylindrical virtual surface having a virtual diameter shorter than the radially inner nominal diameter of the radially inner substantially cylindrical surface portion 14a.

The virtual diameter of the aforementioned substantially cylindrical virtual surface is less than the radially outer nominal diameter of the outer ring 34 of the bearing 30, so as to obtain a coupling with interference of the outer ring 34 of the bearing 30 on just the ribs 18, without however there being interference between the aforementioned outer ring 34 and the radially inner substantially cylindrical surface portion 14a.

With particular reference to the non-limiting examples of FIGS. 1-2 and 3-4, the ribs 18 are preferably more than two and are circumferentially distributed in uniform manner along the radially inner substantially cylindrical surface portion 14a of the substantially cylindrical main portion 14 of the annular body 12.

In particular, in the embodiment of FIGS. 1 and 2, the ribs 18 are all arranged on a single circumferential row 180. In the specific example illustrated in such figures, there are eight ribs 18 and they are arranged at 45° from one another.

In the non-limiting example of FIGS. 1 and 2, the ribs 18 all have a same predetermined radial extension, a same predetermined axial extension, a same predetermined circumferential extension and a same shape.

In the embodiment of FIGS. 1 and 2, the ribs 18 extend axially along respective directions substantially parallel to the longitudinal axis of symmetry Y of the annular body 12. Such ribs 18 have a shorter circumferential extension than the aforementioned axial extension, so as to take a substantially rectangular shape with longer side oriented in axial direction. In an embodiment that is not illustrated, the ribs 18 have a circumferential extension substantially equal to the aforementioned axial extension, so as to take a substantially square shape.

As shown in FIGS. 1 and 2, the axial extension of the ribs 18 is less than the axial extension of the aforementioned radially inner substantially cylindrical surface portion 14a. Consequently, the housing seat 16 of the bearing 30 comprises an axially outermost first annular portion 16c devoid of ribs 18 and an axially innermost second annular portion 16d where the ribs 18 are made (FIG. 2).

The aforementioned axially outermost first annular portion 16c acts as centering annular portion of the bearing 30, before the coupling thereof with interference with the ribs 18 present in the axially innermost second annular portion 16d.

Each rib 18 has, at an axially outer end face 18a thereof, a tapering that defines a connection portion towards the axially outermost first annular portion 16c. Such taperings allow a gradual engagement of the ribs 18 during the insertion of the bearing 30 in the bearing cup 10.

Each rib 18 comprises an axially inner end portion 18b arranged at the shoulder 16a of the housing seat 16.

In the non-limiting example of FIGS. 1 and 2, the ribs 18 have an axial extension substantially equal to the axial dimension E of the bearing 30. The ribs 18 (all or only some of them) can however also have an axial extension smaller or greater than the axial dimension E of the bearing 30.

For example, the ribs 18 can have a radial extension comprised in the range between about 0.05 mm and about 0.15 mm, including extreme values.

Figure 3:
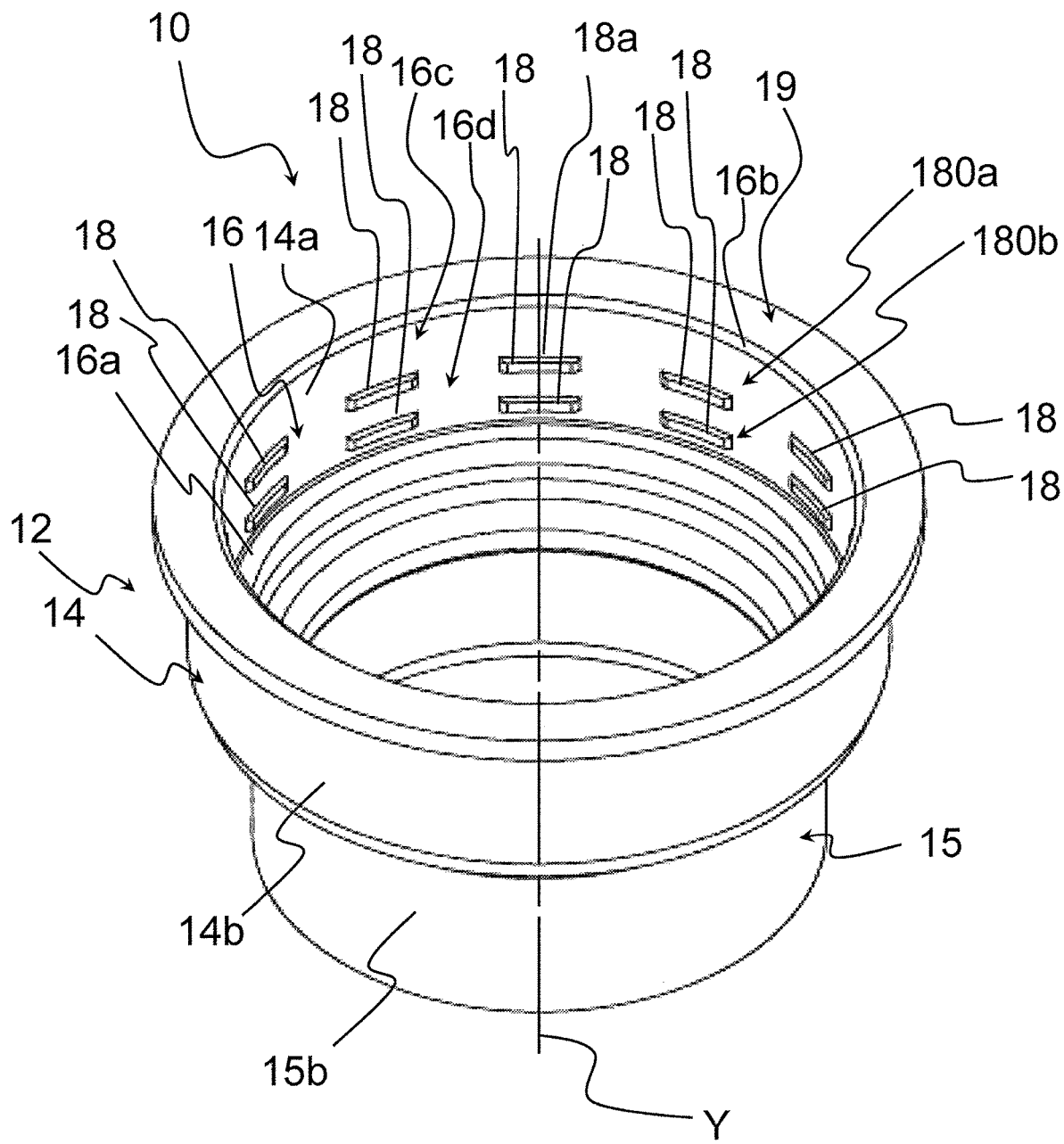
FIG. 3 is a schematic perspective view of a bearing cup for a bicycle bottom bracket assembly, in accordance with a second embodiment of the present invention.

The embodiment of the bearing cup 10 of FIGS. 3 and 4 differs from that of FIGS. 1 and 2 only for the different orientation and for the different arrangement of the ribs 18.

Also in the embodiment of FIGS. 3 and 4 the ribs 18 are circumferentially distributed in uniform manner along the radially inner substantially cylindrical surface portion 14a of the substantially cylindrical main portion 14 of the annular body 12, but in this case the ribs 18 are distributed in two parallel circumferential rows 180a, 180b, each rib 18 of each circumferential row 180a, 180b being axially aligned with a respective rib 18 of the other circumferential row 180b, 180a. In an alternative embodiment that is not illustrated, the ribs 18 of a circumferential row 180a, 180b are arranged staggered or misaligned with respect to the ribs 18 of the other circumferential row 180b, 180a. In the specific example illustrated in FIGS. 3 and 4, each circumferential row 180a, 180b comprises twelve ribs 18 arranged at 30° from one another, with each rib 18 of the circumferential row 180a axially aligned with a respective rib 18 of the circumferential row 180b and vice-versa. The number of ribs 18 of each circumferential row 180a, 180b can be different from that indicated above.

In the non-limiting example of FIGS. 3 and 4, the ribs 18 all have a same predetermined radial extension, a same predetermined axial extension, a same predetermined circumferential extension and a same shape.

In the embodiment of FIGS. 3 and 4, each of the ribs 18 has a circumferential extension greater than the respective axial extension, so as to take a substantially rectangular shape, with longer side oriented in circumferential direction. In an embodiment that is not illustrated, the ribs 18 have a circumferential extension substantially equal to the aforementioned axial extension, so as to each take a substantially square shape.

Also in the embodiment of FIGS. 3 and 4 the axial extension of the ribs 18 is less than the axial extension of the aforementioned radially inner substantially cylindrical surface portion 14a. Consequently, the housing seat 16 of the bearing 30 also in this case comprises an axially outermost first annular portion 16c devoid of ribs 18 and an axially innermost second annular portion 16d where the ribs 18 are made (FIG. 4).

Also in the embodiment of FIGS. 3 and 4 each rib 18 has, at an axially outer end face 18a thereof, a tapering that defines a connection portion towards the axially outermost first annular portion 16c. For the sake of simplicity of illustration in FIGS. 3 and 4 the reference numeral 18a is associated with the axial end face of only one of the ribs 18 illustrated.

Figure 5:
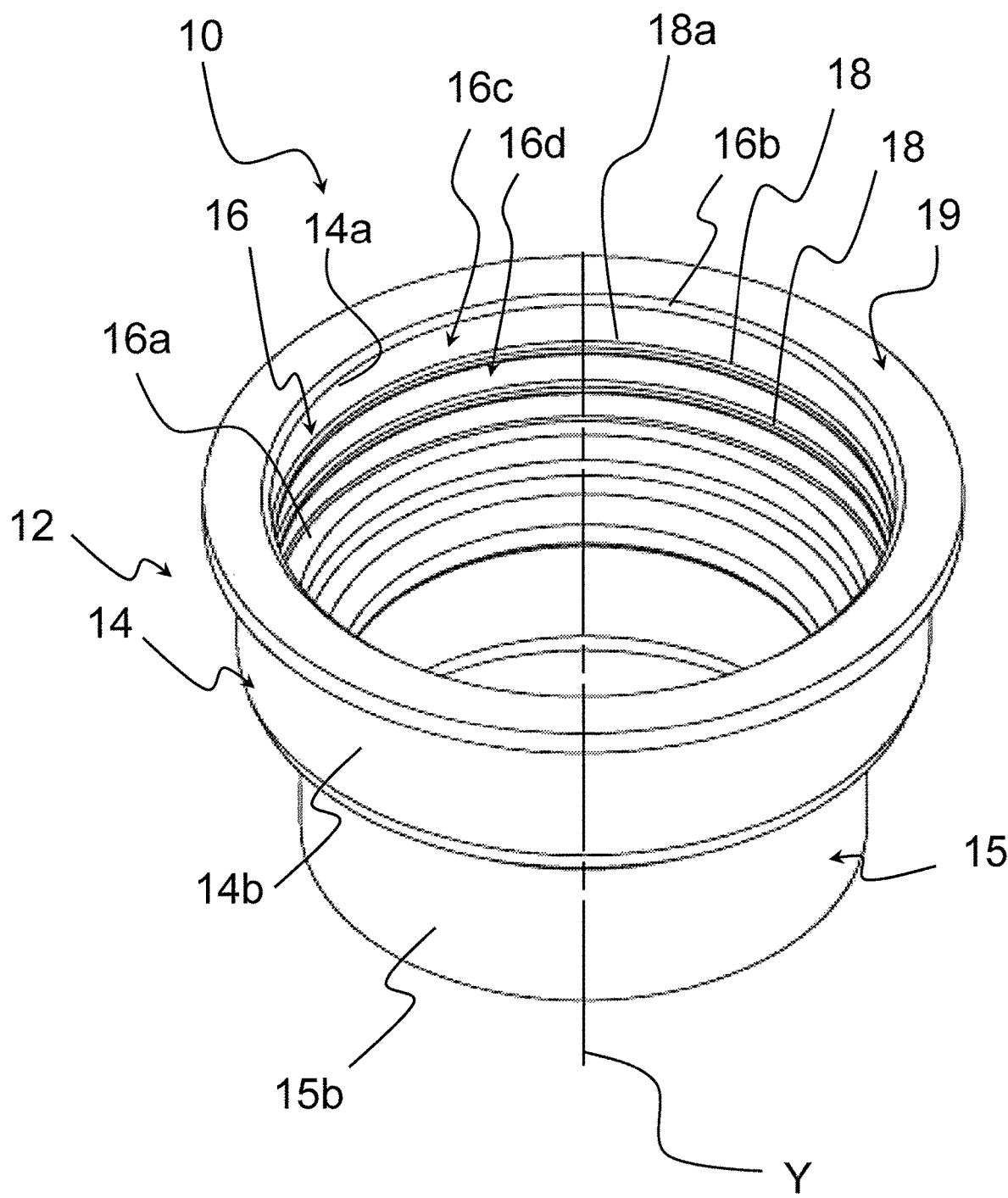
FIG. 5 is a schematic perspective view of a bearing cup for a bicycle bottom bracket assembly, in accordance with a third embodiment of the present invention.

The embodiment of the bearing cup 10 of FIGS. 5 and 6 differs from that of FIGS. 1 and 2 and from that of FIGS. 3 and 4 only for the different kind of ribs 18.

In this case, the ribs 18 extend continuously along the radially inner substantially cylindrical surface portion 14a of the substantially cylindrical main portion 14 of the annular body 12, to define at least one annular rib 18. In the specific case illustrated, the ribs 18 define two annular ribs 18 parallel and coaxial to the longitudinal axis of symmetry Y of the bearing cup 10. The number of annular ribs 18 can be different from two.

In the non-limiting example of FIGS. 5 and 6, the annular ribs 18 all have a same predetermined radial extension, a same predetermined axial extension and a same shape.

Also in the embodiment of FIGS. 5 and 6 the axial extension of the ribs 18 is less than the axial extension of the aforementioned radially inner substantially cylindrical surface portion 14a. Consequently, the housing seat 16 of the bearing 30 also in this case comprises an axially outermost first annular portion 16c devoid of ribs 18 and an axially innermost second annular portion 16d where the ribs 18 are made (FIG. 6).

Also in the embodiment of FIGS. 5 and 6 each rib 18 has, at an axially outer end face 18a thereof, a tapering that defines a connection portion towards the axially outermost first annular portion 16c. For the sake of simplicity of illustration in FIGS. 5 and 6 the reference numeral 18a is associated with the axial end face of only one of the ribs 18 illustrated.

In all of the embodiments thereof described above, the bearing cup 10 is mounted with interference on the shaft-housing box 22 at the radially outer cylindrical surface portion 14b and is inserted in the free end portion 23 of the shaft-housing box 22 until an annular abutment collar 19 of the bearing cup 10 abuts with the free end portion 23.

The annular collar 19 is arranged in axially outer position with respect to the substantially cylindrical main portion 14 and extends substantially perpendicular with respect to the longitudinal axis of symmetry Y in radially outer direction with respect to the substantially cylindrical main portion 14, so as to form an abutment shoulder 19a.

As shown in the example of FIGS. 7 and 8, a washer 50 is axially interposed between the annular collar 19 and the free end portion 23 of the shaft-housing box 22 when the bearing cup 10 is coupled with the shaft-housing box 22. In the specific example illustrated here, the washer 50 has a substantially square section.

In embodiments alternative to that illustrated here, the washer 50 is not used.

The housing seat 16 of the bearing 30 defined in the bearing cup 10 comprises an annular flaring 16b arranged in axially outer position, adjacent to the annular collar 19. The annular flaring 16b acts as facilitation for the insertion of the bearing 30 in the housing seat 16.

FIGS. 7 and 8 illustrate two different ways of mounting the bottom bracket assembly 40 in the shaft-housing box 22.

For the sake of simplicity of illustration in both of the illustrated ways of mounting the bearing cup 10 is illustrated devoid of ribs 18. The latter can be of the type described with reference to FIGS. 1-2, with reference to FIGS. 3-4 or with reference to FIGS. 5-6. It is also possible to provide bearing cups 10 having ribs 18 in part identical to those described with reference to FIGS. 1-2 and in part identical to those described with reference to FIGS. 3-4 and/or 5-6, or ribs 18 in part identical to those described with reference to FIGS. 3-4 and in part identical to those described with reference to FIGS. 5-6.

Firstly, the operator assembles the crank arm assemblies 42 by coupling each crank 44 (right and left) with the respective shaft element 46 (right and left). Such coupling is carried out for example through matching threadings 45 (FIGS. 7 and 8), or through grooved profiles, or by press-fitting.

In accordance with the way of mounting of FIG. 7, the bearing 30 is pre-mounted inside the bearing cup 10, in the housing seat 16. The bearing cup 10 is subsequently coupled with interference with the shaft-housing box 22, interposing the washer 50.

The shaft element 46 of the crank arm assembly 42 is then inserted, according to the direction of the arrow F of FIG. 7, in the inner ring 32 of the bearing 30. The insertion proceeds until the inner ring 32 abuts on a shoulder 46a formed on the shaft element 46.

In accordance with the way of mounting of FIG. 8, the bearing cup 10 is coupled with interference with the shaft-housing box 22, interposing the washer 50. The bearing 30 in this case is pre-mounted on the shaft element 46 of the crank arm assembly 42. In particular, the bearing 30 is coupled with the shaft element 46 and has the inner ring 32 in abutment on the shoulder 46a of the shaft element 46.

The inner ring 32 of the bearing 30 is locked in position through a washer 52 housed in a respective seat 46b formed on the shaft element 46 on axially opposite side to the shoulder 46a with respect to the inner ring 32 of the bearing 30 (when the bearing 30 is in abutment on the shoulder 46a).

The shaft element 46 of the crank arm assembly 42 is then inserted, according to the direction of the arrow F of FIG. 8, in the shaft-housing box 22 until the outer ring 34 of the bearing 30 is arranged in the housing seat 16. The insertion ends when the outer ring 34 abuts on the shoulder 16a of the housing seat 16.

In both the ways of mounting described above, the bearing cup 10 is pre-mounted with interference at the free end portion 23 of the shaft-housing box 22.

FIGS. 7 and 8 show only the portion of the bottom bracket assembly 40 that comprises a crank arm assembly 42. The complete bottom bracket assembly 40 is made by coupling the axially inner free end portion 47 of the shaft element 46 of such a crank arm assembly 42 with the axially inner free end portion of the shaft element of an opposite crank arm assembly.

The present invention makes it possible to make a coupling between bearing cup 10 and bearing 30 with interferences of few hundredths of a millimeter, for example comprised between 0.01 and 0.03 mm, including extreme values.

In a non-limiting example, the bearing 30 has:
radially inner nominal diameter D equal to 25 mm with dimensional tolerances [+0; −0.008],
radially outer nominal diameter C equal to 37 mm with dimensional tolerances [+0; −0.009], and
axial dimension E equal to 6 mm with dimensional tolerances [+0; −0.04].

In this case, the bearing cup 10 can advantageously be sized as below:

virtual diameter of the substantially cylindrical virtual surface defined by the ribs 18 equal to 36.9 mm with dimensional tolerances [+0.03; −0.03], diameter of the radially inner substantially cylindrical surface portion 14a equal to 37 mm with dimensional tolerances [+0; +0.05] in the case of the way of mounting of FIG. 7, or with dimensional tolerances [+0.05; +0.1] in the case of the way of mounting of FIG. 8.

As can be seen from the dimensional values given above, the bearing 30 always couples with clearance in the radially inner substantially cylindrical surface portion 14a, always coupling with interference with the ribs 18.

In particular, in the case of the way of mounting of FIG. 7, when the bearing 30 is inserted on the bearing cup 10 a coupling with interference is made with the ribs 18, which undergo a slight plastic deformation. The bearing cup 10, since it is more deformable than the bearing 30, typically made of steel, undergoes a slight widening. When the bearing cup 10 is inserted in the shaft-housing box 22, the bearing cup 10 undergoes a great narrowing that only partially discharges on the bearing 30 thanks to a further, but this time substantial, plastic deformation of the ribs 18.

In the case of the way of mounting of FIG. 8, when the bearing cup 10 is inserted in the shaft-housing box 22, a slight narrowing of the diameter of the radially inner substantially cylindrical surface portion 14a, however such as not to become less than or equal to the radially outer nominal diameter C of the bearing 30, is obtained. When the bearing 30 is inserted in the bearing cup 10, a slight force is necessary to plasticize the ribs 18, but in any case the risk of having a coupling with excessive clearance will be avoided.

In both the ways of mounting, the ribs 18 perform a "pad" function, deforming under the action of the increasing press-fitting pressures by adapting the virtual diameter of the substantially cylindrical virtual surface as a function of the specific conditions. Such a pad function progressively decreases until it disappears when the radial extension of the ribs 18 zeroes with respect to the diameter of the radially inner substantially cylindrical surface portion 14a.

The number of ribs 18, their radial extension and their dimensions (axial extension and circumferential extension) are selected as a function of the interference that it is wished to obtain with the bearing 30.

The Applicant deems that the radial extension of the ribs 18 can be reduced by increasing the number of ribs 18, since the interference force is distributed in several areas.

The Applicant further deems that, with particular reference to the embodiments of FIGS. 1-2 and 3-4, the number of ribs 18 can be reduced by increasing the circumferential extension of the ribs 18, since the interference force is distributed in several areas of greater size. On the other hand, with reference to the embodiment of FIGS. 5 and 6, the number of annular ribs 18 can be reduced to one by increasing the axial extension of the single annular rib 18 provided.

The bearing cup 10 can be made through injection molding or through pressure casting or through turning.

The bearing cup 10 of FIGS. 1 and 2 is preferably made of a plastic material, possibly reinforced with the structural fibers discussed above, through an injection molding process.

The bearing cup 10 of FIGS. 3 and 4 can be made of a plastic material through an injection molding process, or of a metal material through a turning process.

The bearing cup 10 of FIGS. 5 and 6 is preferably made of a metal material through a turning process.

In the particularly preferred embodiments of the invention, the ribs 18 are preferably made in one piece with the bearing cup 10, which is preferably made by injection molding or pressure casting. Such processes are less onerous and expensive than the chip-removal mechanical processing (typically a turning) used for example to make the bush, interposed between frame and bearing, that is shown in FIG. 10 of U.S. Pat. No. 9,388,847.

The Applicant has carried out comparative simulations on the different deformations that the bearing 30 undergoes mounted in a bearing cup 10 according to the invention (in particular provided with ribs 18 of the type illustrated in FIGS. 1-2) and in a bearing cup devoid of ribs 18. For example, in a comparative simulation in which the ribs 18 have a radial extension of 0.05 mm, with a total interference of 0.10 mm between bearing cup 10 and shaft-housing box 22 and a radially inner diameter of the housing seat 16 equal to 37 mm, the Applicant has found that the deformation that the bearing 30 undergoes in the case of bearing cup devoid of ribs 18 is almost 35% greater with respect to the case of bearing cup 10 provided with ribs 18. In particular, the Applicant has measured, in the case of a bearing cup 10 provided with ribs 18, a narrowing of the radially outer diameter of the bearing 30 of 0.058 mm, with respect to the 0.073 mm measured under the same conditions in the case of a bearing cup devoid of ribs 18.

Of course, in order to satisfy specific and contingent requirements, those skilled in the art can bring numerous modifications and variants to the present invention, all of which are in any case included in the scope of protection defined by the following claims.

What is claimed is:

1. A bearing cup for a bicycle bottom bracket assembly, the bearing cup comprising:
    an annular body having a radially outer substantially cylindrical surface portion configured to be coupled with a frame of a bicycle; and
    a radially inner substantially cylindrical surface portion defining a housing seat for a bearing,
    wherein the bearing cup comprises a plurality of ribs extending radially inwards from said radially inner substantially cylindrical surface portion and configured to be coupled with interference with said bearing,
    wherein at least two ribs of said plurality of ribs have a same predetermined axial extension,
    wherein each rib of said plurality of ribs has a greater circumferential extension than the predetermined axial extension and extends circumferentially along at least one circumferential row.

2. The bearing cup according to claim 1, wherein at least two ribs of said plurality of ribs have a same predetermined radial extension.

3. The bearing cup according to claim 1, wherein each rib of said plurality of ribs are circumferentially distributed in a uniform manner along said radially inner substantially cylindrical surface portion.

4. The bearing cup according to claim 3, wherein at least two ribs of said plurality of ribs have a same predetermined circumferential extension.

5. The bearing cup according to claim 3, wherein all ribs of said plurality of ribs have a same predetermined circumferential extension.

6. The bearing cup according to claim 1, wherein each rib of said plurality of ribs comprises a tapered axially outer end face.

7. The bearing cup according to claim 1, wherein said plurality of ribs are distributed in at least two circumferential rows that are parallel and coaxial to a longitudinal axis of symmetry of the annular body.

8. The bearing cup according to claim 7, wherein each rib distributed in a first circumferential row of said at least two circumferential rows is axially aligned with a respective rib of a second circumferential row of said at least two circumferential rows along a respective direction substantially parallel to said longitudinal axis of symmetry.

9. The bearing cup according to claim 1, wherein all ribs of said plurality of ribs have a same predetermined radial extension.

10. The bearing cup according to claim 1, wherein all ribs of said plurality of ribs have a same predetermined axial extension.

11. The bearing cup according to claim 1 wherein said radially inner substantially cylindrical surface portion has a predetermined axial extension and wherein an axial extension of the plurality of ribs is less than said predetermined axial extension.

12. A bicycle bottom bracket assembly comprising:
at least one bearing cup according to claim 1, and
a bearing configured to be housed inside said bearing cup,
wherein said bearing has a predetermined radially outer nominal diameter and
wherein said radially inner substantially cylindrical surface portion has a greater radially inner nominal diameter than said predetermined radially outer nominal diameter.

13. A bearing cup for a bicycle bottom bracket assembly, the bearing cup comprising:
an annular body having a radially outer substantially cylindrical surface portion configured to be coupled with a frame of a bicycle; and
a radially inner substantially cylindrical surface portion defining a housing seat for a bearing,
wherein the bearing cup comprises a plurality of ribs extending radially inwards from said radially inner substantially cylindrical surface portion and configured to be coupled with interference with said bearing,
wherein said plurality of ribs extend continuously along said radially inner substantially cylindrical surface portion to define two annular ribs.

14. The bearing cup according to claim 13, wherein all ribs of said plurality of ribs have a same predetermined radial extension.

15. The bearing cup according to claim 13, wherein all ribs of said plurality of ribs have a same predetermined axial extension.

16. The bearing cup according to claim 13 wherein said radially inner substantially cylindrical surface portion has a predetermined axial extension and wherein an axial extension of the plurality of ribs is less than said predetermined axial extension.

17. A bicycle bottom bracket assembly comprising:
at least one bearing cup according to claim 13, and
a bearing configured to be housed inside said bearing cup,
wherein said bearing has a predetermined radially outer nominal diameter and
wherein said radially inner substantially cylindrical surface portion has a greater radially inner nominal diameter than said predetermined radially outer nominal diameter.

18. The bearing cup according to claim 17, wherein the two annular ribs have a same predetermined radial extension.

19. The bearing cup according to claim 17, wherein each rib of said plurality of ribs comprises a tapered axially outer end face.

* * * * *